(12) United States Patent
Goseberg et al.

(10) Patent No.: US 11,472,338 B2
(45) Date of Patent: Oct. 18, 2022

(54) METHOD FOR DISPLAYING REDUCED DISTORTION VIDEO IMAGES VIA A VEHICULAR VISION SYSTEM

(71) Applicant: MAGNA ELECTRONICS INC., Auburn Hills, MI (US)

(72) Inventors: Frank Goseberg, Aschaffenburg (DE); Ruediger Boegel, Grossostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 55 days.

(21) Appl. No.: 17/248,421

(22) Filed: Jan. 25, 2021

(65) Prior Publication Data
US 2021/0146838 A1 May 20, 2021

Related U.S. Application Data

(63) Continuation of application No. 16/734,502, filed on Jan. 6, 2020, now Pat. No. 10,899,277, which is a
(Continued)

(51) Int. Cl.
*B60R 1/00* (2022.01)
*H04N 5/232* (2006.01)
*G06F 3/01* (2006.01)

(52) U.S. Cl.
CPC ............... *B60R 1/00* (2013.01); *G06F 3/012* (2013.01); *G06F 3/013* (2013.01);
(Continued)

(58) Field of Classification Search
CPC ............... B60R 1/00; B60R 2300/303; B60R 2300/307; H04N 5/23238; G06F 3/012; G06F 3/013
See application file for complete search history.

(56) References Cited

U.S. PATENT DOCUMENTS 5,550,677 A    8/1996   Schofield et al.
5,646,614 A    7/1997   Abersfelder et al.
(Continued)

FOREIGN PATENT DOCUMENTS

WO    2011/155878 A1    12/2011
WO    2012103193 A1     8/2012
(Continued)

OTHER PUBLICATIONS

Hicks et al., "Panoramic Electronic Rear Vision for Automotive Applications", SAE Technical Paper Series, International Congress and Exposition, Detroit, MI, Mar. 1-4, 1999.

*Primary Examiner* — Joon Kwon
(74) *Attorney, Agent, or Firm* — Honigman LLP

(57) ABSTRACT

A method for displaying video images via a vehicular vision system includes providing a rear backup camera having an imager and a wide angle lens disposed at the imager with its center axis vertically offset from a center region of an imaging array sensor of the imager. A distant central horizon region is imaged at the upper region of the imaging array sensor via light that has passed through a center region of the wide angle lens, and a closer region is imaged at the center region and the lower region of the imaging array sensor via light that has passed through a lower peripheral region of the wide angle lens. Video images derived from image data captured by the rear backup camera are displayed on a video display for viewing by a driver of the vehicle during a reversing maneuver of the vehicle.

26 Claims, 15 Drawing Sheets

Related U.S. Application Data continuation of application No. 14/852,950, filed on Sep. 14, 2015, now Pat. No. 10,525,883.

(60) Provisional application No. 62/120,040, filed on Feb. 24, 2015, provisional application No. 62/057,272, filed on Sep. 30, 2014, provisional application No. 62/050,420, filed on Sep. 15, 2014.

(52) U.S. Cl.
CPC .... *H04N 5/23238* (2013.01); *B60R 2300/303* (2013.01); *B60R 2300/307* (2013.01)

(56) References Cited

U.S. PATENT DOCUMENTS

| | | | |
|---|---|---|---|
| 5,670,935 A | 9/1997 | Schofield et al. | |
| 5,949,331 A | 9/1999 | Schofield et al. | |
| 6,396,397 B1 | 5/2002 | Bos et al. | |
| 6,424,272 B1 | 7/2002 | Gutta et al. | |
| 6,509,832 B1 | 1/2003 | Bauer et al. | |
| 6,717,610 B1 | 4/2004 | Bos et al. | |
| 7,005,974 B2 | 2/2006 | McMahon et al. | |
| 7,914,187 B2 | 3/2011 | Higgins-Luthman et al. | |
| 8,421,865 B2 | 4/2013 | Euler et al. | |
| 8,462,209 B2 | 6/2013 | Sun | |
| 8,477,191 B2 | 7/2013 | Ito et al. | |
| 8,798,451 B1 | 8/2014 | Kweon | |
| 9,085,261 B2 | 7/2015 | Lu et al. | |
| 9,146,898 B2 | 9/2015 | Ihlenburg et al. | |
| 9,150,155 B2 | 10/2015 | Vico et al. | |
| 9,280,202 B2 | 3/2016 | Gieseke et al. | |
| 10,525,883 B2 | 1/2020 | Goseberg et al. | |
| 10,899,277 B2 | 1/2021 | Goseberg et al. | |
| 2002/0167589 A1 | 11/2002 | Schofield et al. | |
| 2004/0008407 A1 | 1/2004 | Wallerstein et al. | |
| 2008/0239527 A1 | 10/2008 | Okabe et al. | |
| 2009/0005961 A1 | 1/2009 | Grabowski et al. | |
| 2009/0243824 A1 | 10/2009 | Peterson et al. | |
| 2010/0020170 A1 | 1/2010 | Higgins-Luthman et al. | |
| 2010/0220189 A1 | 9/2010 | Yanagi | |
| 2010/0265048 A1* | 10/2010 | Lu | B60C 9/005 340/435 |
| 2010/0328499 A1 | 12/2010 | Sun | |
| 2011/0032374 A1 | 2/2011 | Imanishi et al. | |
| 2011/0069148 A1* | 3/2011 | Jones | H04N 5/23238 348/36 |
| 2011/0291918 A1 | 12/2011 | Surber et al. | |
| 2012/0169875 A1 | 7/2012 | Matsukawa et al. | |
| 2012/0242882 A1 | 9/2012 | Sutton et al. | |
| 2012/0257060 A1 | 10/2012 | Bos et al. | |
| 2012/0265416 A1 | 10/2012 | Lu et al. | |
| 2013/0046441 A1 | 2/2013 | Marczok et al. | |
| 2013/0222592 A1 | 8/2013 | Gieseke | |
| 2014/0067206 A1 | 3/2014 | Pflug | |
| 2014/0085472 A1 | 3/2014 | Lu et al. | |
| 2014/0160276 A1 | 6/2014 | Pliefke et al. | |
| 2014/0168415 A1 | 6/2014 | Ihlenburg et al. | |
| 2014/0247352 A1 | 9/2014 | Rathi et al. | |
| 2014/0309884 A1 | 10/2014 | Wolf | |
| 2014/0336876 A1 | 11/2014 | Gieseke et al. | |
| 2014/0362209 A1 | 12/2014 | Ziegenspeck et al. | |
| 2014/0368654 A1 | 12/2014 | Wierich | |
| 2015/0002670 A1 | 1/2015 | Bajpai | |
| 2015/0009010 A1 | 1/2015 | Biemer | |
| 2015/0015710 A1 | 1/2015 | Tiryaki | |
| 2015/0042808 A1 | 2/2015 | Pflug | |
| 2015/0217693 A1 | 8/2015 | Pliefke et al. | |
| 2015/0222664 A1 | 8/2015 | Battre et al. | |
| 2015/0222798 A1 | 8/2015 | Fuchikami | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2016/0021309 A1* | 1/2016 | Wu | H04N 5/2251 348/143 |
| 2016/0137126 A1* | 5/2016 | Fürsich | B60R 1/00 348/148 |
| 2016/0209647 A1 | 7/2016 | Fursich | |
| 2017/0124405 A1 | 5/2017 | Gupta | |
| 2017/0232898 A1 | 8/2017 | Maejima et al. | |

FOREIGN PATENT DOCUMENTS

| | | |
|---|---|---|
| WO | 2012/145501 A1 | 10/2012 |
| WO | 2012/158167 A1 | 11/2012 |
| WO | 2012145822 A1 | 11/2012 |
| WO | 2013/067082 A1 | 5/2013 |
| WO | 2013067083 A1 | 5/2013 |
| WO | 2013074604 A2 | 5/2013 |
| WO | 2013086249 A2 | 6/2013 |
| WO | 2013/109869 A1 | 7/2013 |

\* cited by examiner

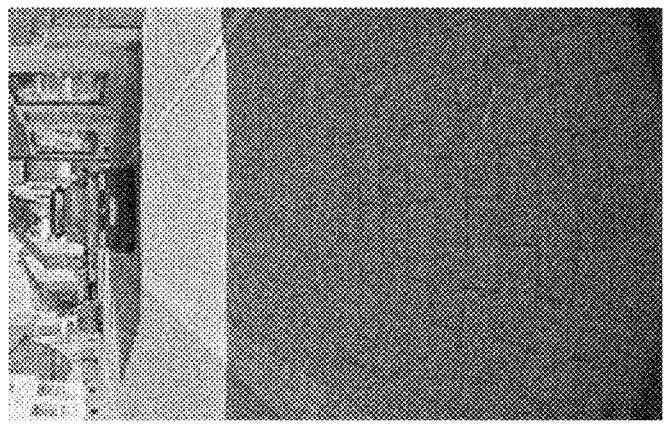
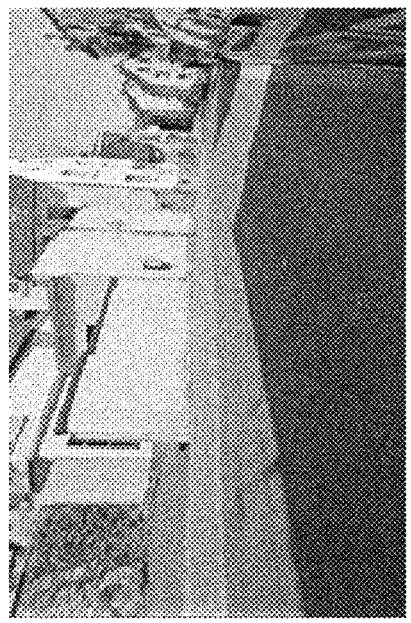
FIG. 6A
FIG. 6B
FIG. 6C

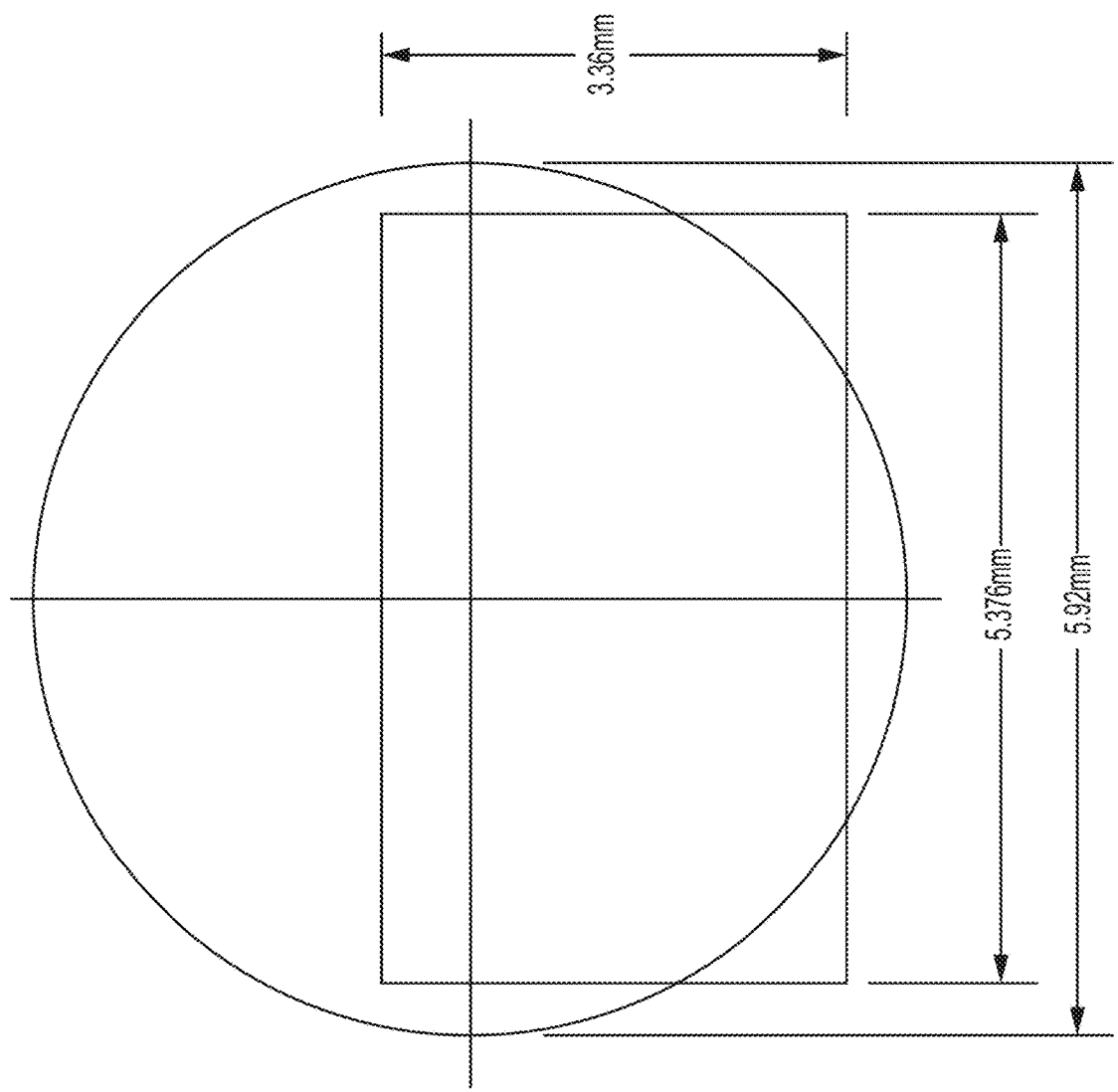

FIG. 12A
FIG. 12D
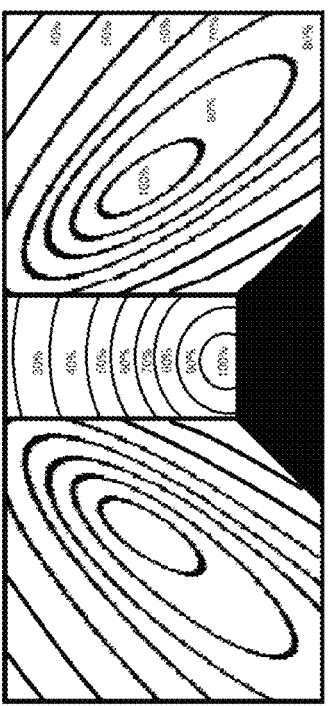
FIG. 12B
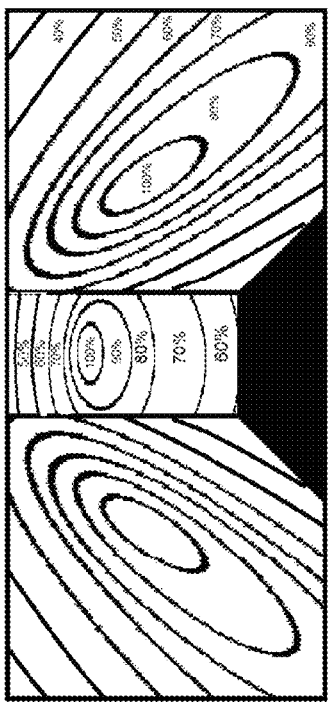
FIG. 12E
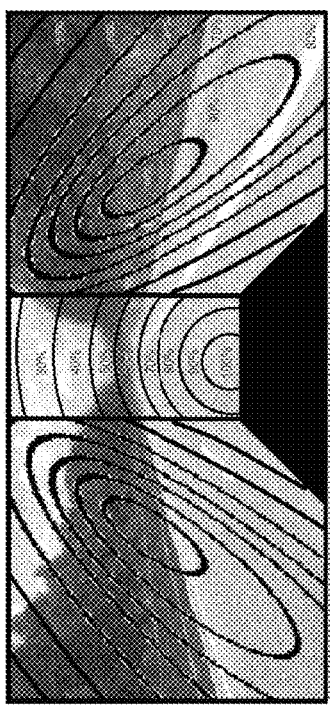
FIG. 12C
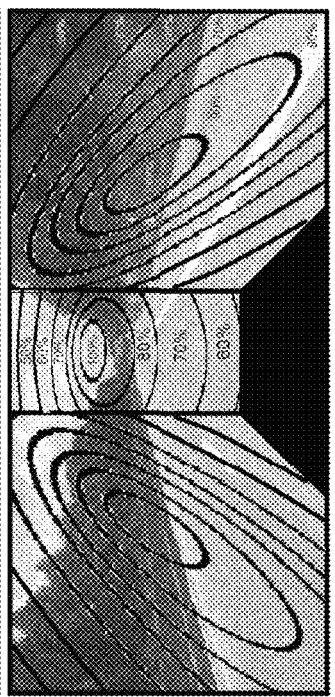
FIG. 12F

METHOD FOR DISPLAYING REDUCED DISTORTION VIDEO IMAGES VIA A VEHICULAR VISION SYSTEM

CROSS REFERENCE TO RELATED APPLICATIONS

The present application is a continuation of U.S. patent application Ser. No. 16/734,502, filed Jan. 6, 2020, now U.S. Pat. No. 10,899,277, which is a continuation of U.S. patent application Ser. No. 14/852,950, filed Sep. 14, 2015, now U.S. Pat. No. 10,525,883, which claims the filing benefits of U.S. provisional applications, Ser. No. 62/120,040, filed Feb. 24, 2015, Ser. No. 62/057,272, filed Sep. 30, 2014, and Ser. No. 62/050,420, filed Sep. 15, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle. The vision system includes a plurality of cameras disposed at the vehicle and having respective fields of view exterior of the vehicle. The cameras capture image data. The cameras include a rear camera disposed at a rear portion of the vehicle and having a rearward field of view. The rear camera has an imager and a wide angle lens that is offset relative to the imager so that the field of view of the rear camera includes rear portions of the vehicle. The cameras include side cameras disposed at respective side portions of the vehicle and having respective sideward and rearward fields of view. An image processor is operable to process image data captured by the cameras. The image processor is operable to merge or stitch or blend image data captured by the cameras to provide a panoramic image for display to the driver of the vehicle during a reversing maneuver of the vehicle. Optionally, a graphic overlay is established on the displayed images.

These and other objects, advantages, purposes and features of the present invention will become apparent upon review of the following specification in conjunction with the drawings.

BRIEF DESCRIPTION OF THE DRAWINGS

FIGS. 6A-C show the source images from which the panorama rear view image of FIG. 2 was stitched;

FIG. 10 is a schematic of a rear camera having a fish eye lens or high distortion lens that is assembled off center of the (rectangle) imager along the short side of the imager in accordance with the present invention;

FIG. 12A is a panorama rear view using a rear camera in accordance with the present invention having a high distortion lens shifted along the imager's short side, showing an image captured by such a rear camera stitched with images from side cameras directed to the rear with imager long side lens shifted;

FIG. 12B is a schematic showing the resolution of each camera source of FIG. 12A, with the middle rear camera image being a cropping of the image of FIG. 11B;

FIG. 12C shows the image of FIG. 12A overlayed with the schematic of FIG. 12B;

FIG. 12D is a panorama rear view using a conventional rear camera with an image captured by such an imager centered lens system stitched with images from side cameras directed to the rear with imager long side lens shifted;

FIG. 12E is a schematic showing the resolution of each camera source of FIG. 12D;

FIG. 12F shows the image of FIG. 12D overlayed with the schematic of FIG. 12E;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
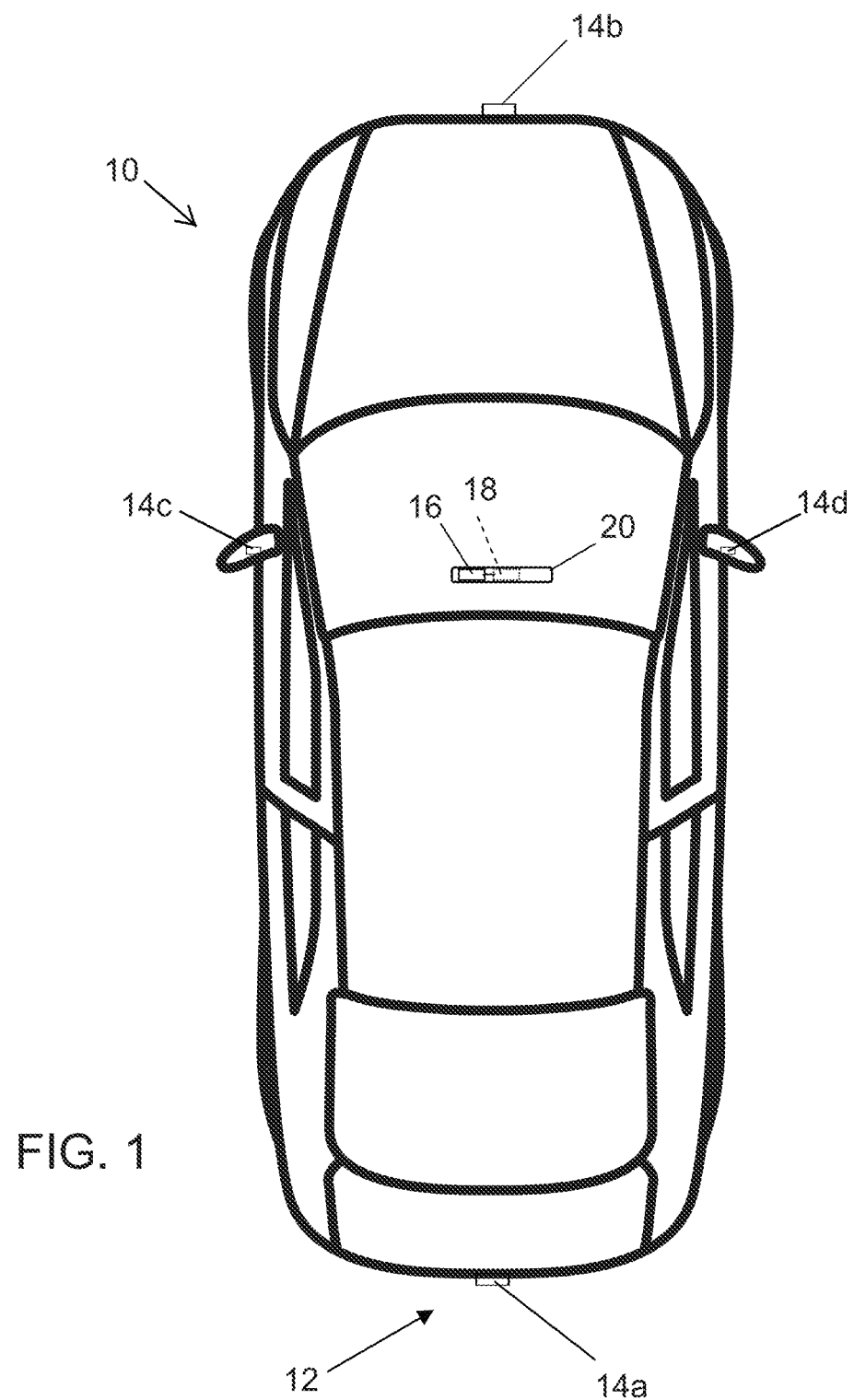
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

An example of a stitched rear view is described in U.S. Publication No. US-2010-0020170, which is hereby incorporated herein by reference in its entirety. In there, fish eye cameras capture and generate images at the sides of the vehicle and at the rear of the vehicle, and the captured images are merged or stitched together to provide a single panoramic view or image.

Figure 2:
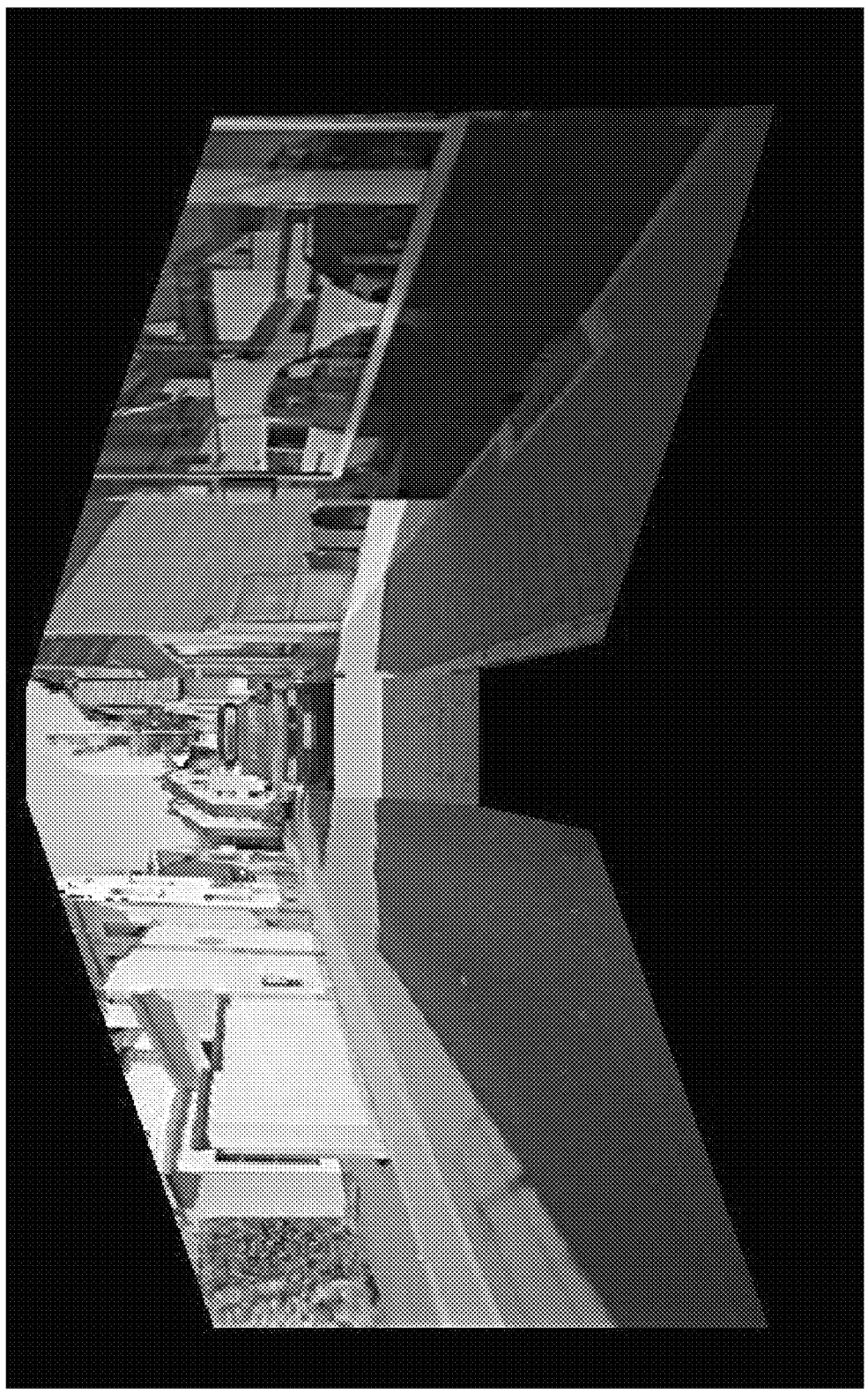
FIG. 2 is a displayed image comprising image portions from three cameras, with the cameras having offset lenses.
Figure 3:
FIG. 3 is an image captured by a rear camera with its imager's long side oriented vertically and the lens shifted upright against the imager, with the left and right rear edge of the vehicle not in the field of view of the rear camera.
Figure 4:
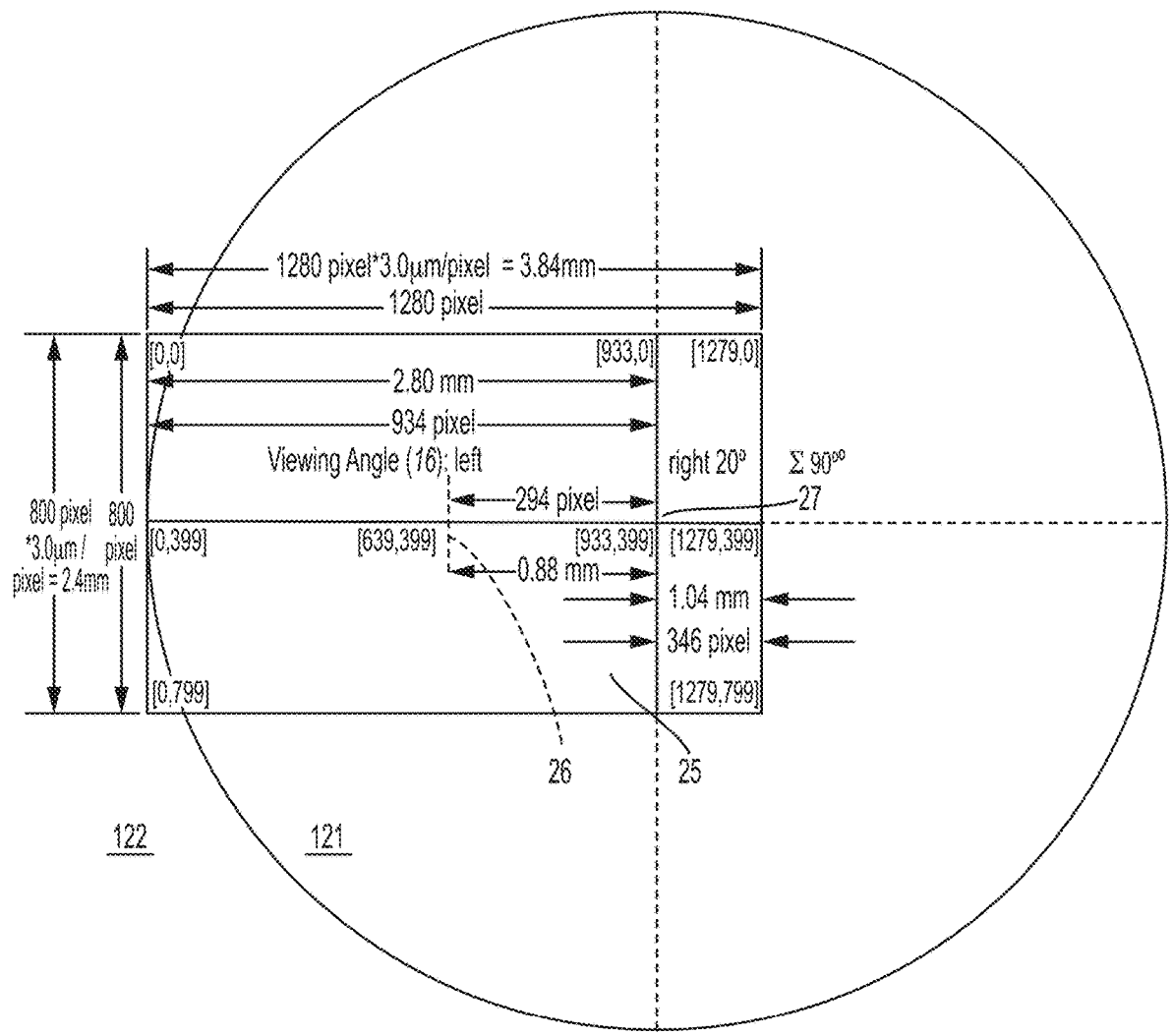
FIG. 4 is a schematic of an imager's sensitive area shifted along the long side against the image circle of a high distortion lens, having a light sensitive area of an imager of a camera 25, with 26 being the center of that imager and 27 being the center of the optical axis of the lens, shown with the full circle of the incoming light projected by the lens system.
Figure 5:
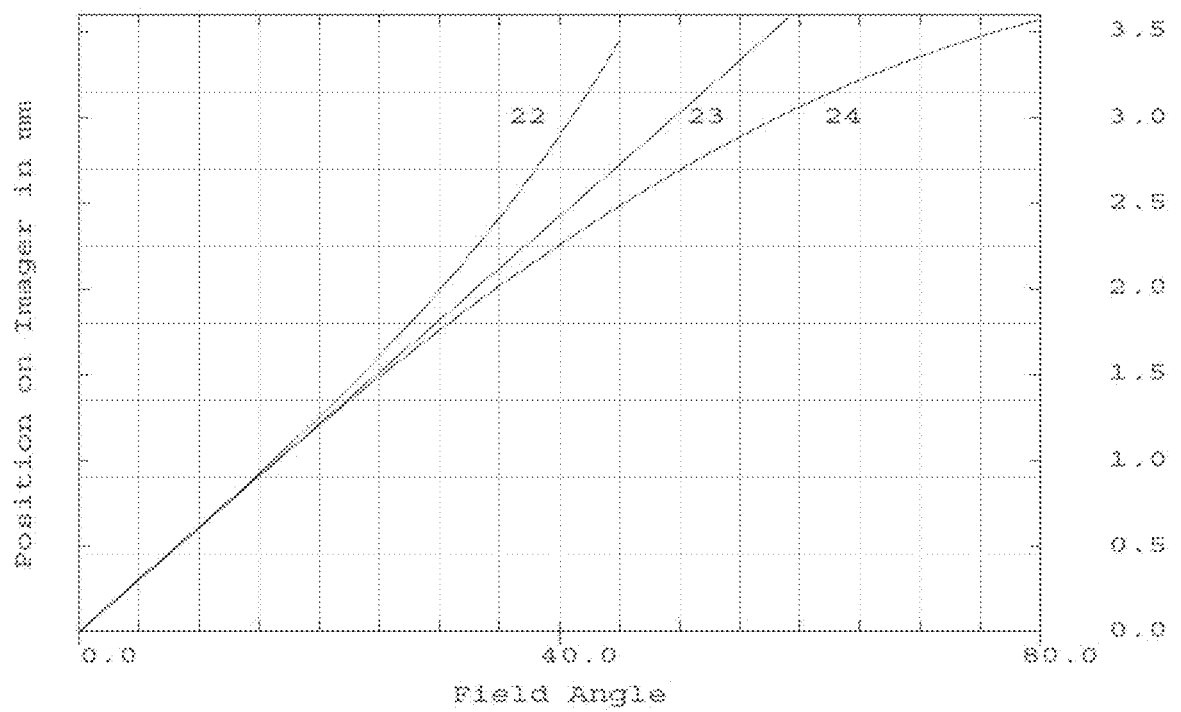
FIG. 5 is a chart showing the distortion behavior of three types of fish eye lenses, with line 22 representing a lower distortion lens with limited viewing angle, line 23 representing a lens with a middle high distortion (f-theta lens), and line 24 representing a higher distortion lens with an increased viewing angle, and with the magnification at the center being similar in all three cases.

In International Publication No. WO 2014/204794 (which is hereby incorporated herein by reference in its entirety) it is suggested to produce a panorama view (such as shown in FIG. 2) using high distortion lens systems on cameras, with the cameras' imagers assembled off center (relative to the fish eye lens) along the imagers' long side, see the configuration in FIG. 4 and produced image of FIG. 3. A Lens map function of a high distortion lens 24 (above F-Theta) is shown in comparison to a F-Theta lens 23 (linear) and a low distortion lens 22 (below F-Theta) in FIG. 5. When using these cameras as side cameras, the camera may be turned horizontally with the high distortion area outboard (see FIGS. 6A and 6B), and when used as a rear camera, the cameras may be turned vertically with the high distortion area downwardly (see FIG. 6C). In such a configuration, the horizontal rear view area has a relatively good resolution (see FIG. 2). The drawback of such a configuration is that the left and right edge of the vehicle is not in the view of the rear camera any more (see FIGS. 3 and 6C), which is desired for rear camera applications such as rear cross traffic view, in which a view is generated of the rear left and rear right of the subject vehicle.

As can be seen in the specific example in FIG. 4, and such as described in International Publication No. WO 2014/204794, the center axis of the lens may be offset from the central region. In the illustrated example, the center axis of the lens is offset or shifted by about 294 pixels or about 0.88 mm (or about 46 percent) from the center region and towards one side of the imaging array (when mounted as a CMS camera, the shift direction may point away from the vehicle body, and the optical center may always point to the most significant region of interest while the higher distorted area may be used to have at least some sensing pixel covering it). The according pixel positions of the optical center 27 (or center axis of the lens), the imager's center 26 and its corners are shown as pixel coordinates in FIG. 4 (such as, for example, the coordinates [639, 399] being at the center of the imager having pixel dimensions 1240×800). As can be seen in FIG. 4, the imager ends on the borderline of the area the optic projects light on 121 (this is an optimized placement, optionally the imager may be more inbound which reduces the high distortion benefit of the area on the far end). In area 122, no direct light (besides maybe stray light) is present. In this example, the lens system may have an overall viewing or opening angle of about 90 degrees.

Figure 7:
FIG. 7 is a displayed image comprising image portions from two side cameras and one rear camera, with all three cameras having fisheye lenses.
Figure 8:
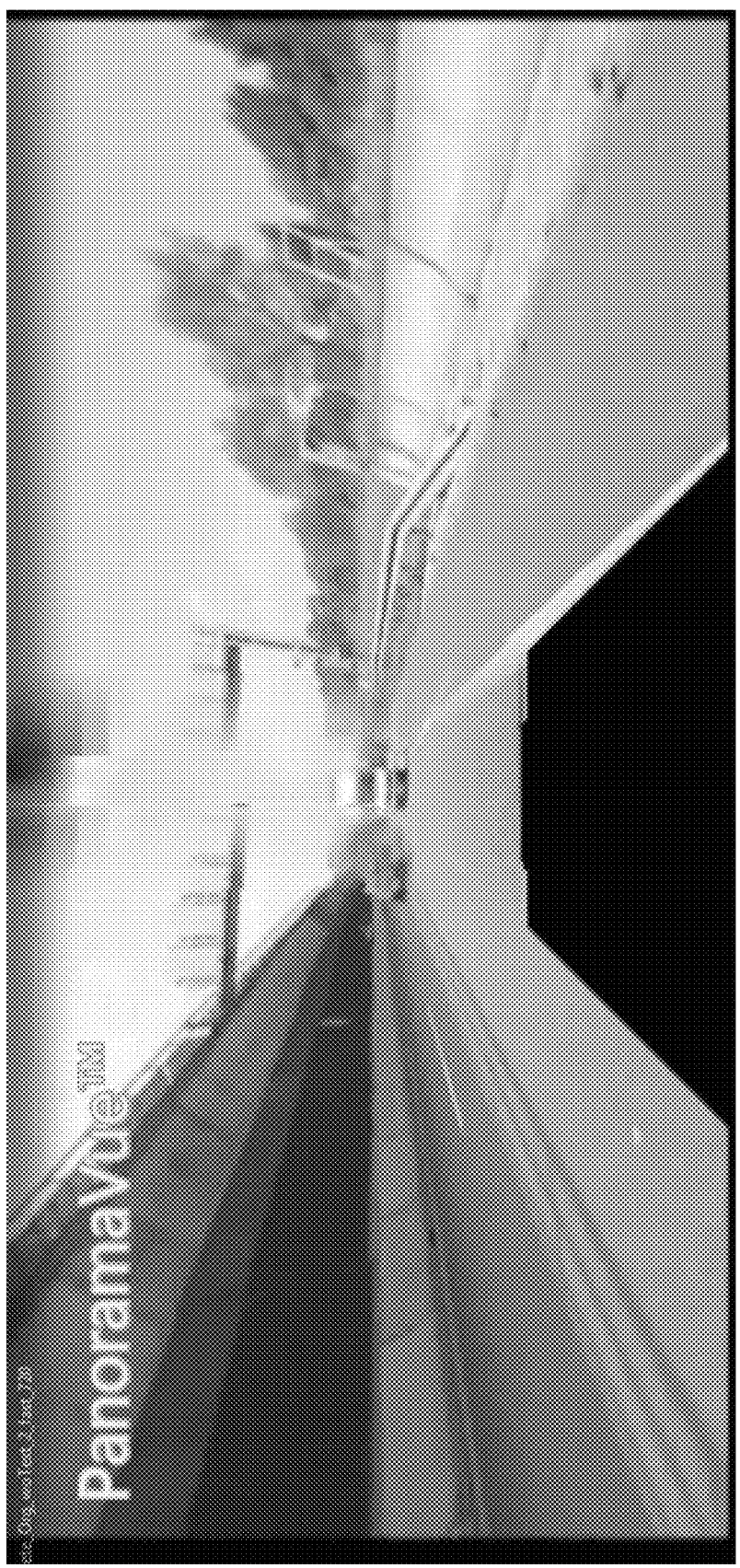
FIG. 8 is a displayed image comprising image portions from two side cameras and one rear camera, with both side cameras having imager long side shifted lenses and the rear camera having a common fisheye lens.
Figure 9A:
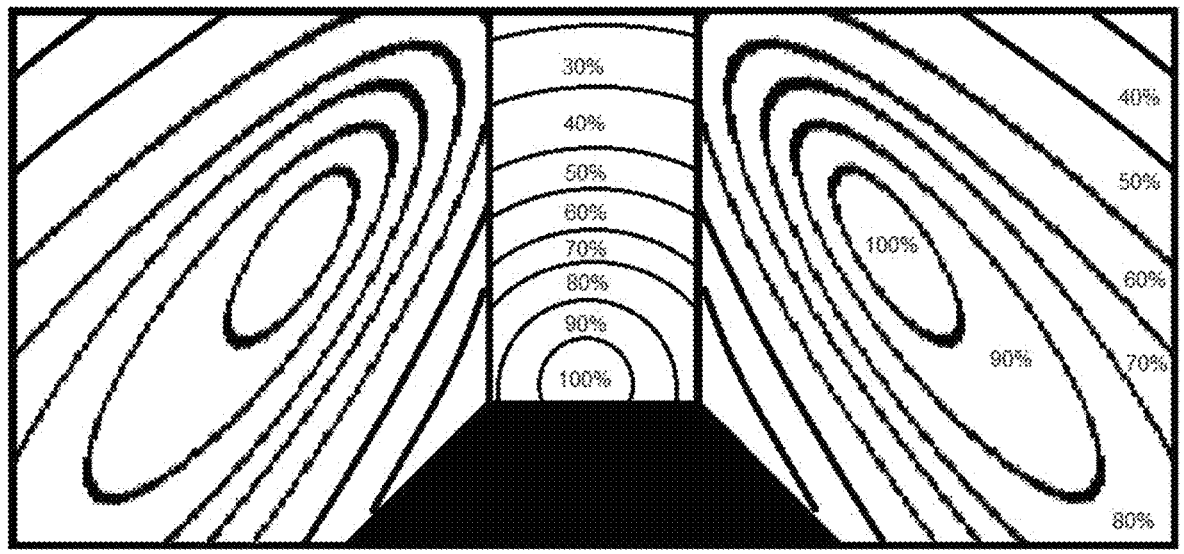
FIG. 9A is a schematic showing resolution of a rear camera having a common fish eye lens with centered imager, with the resolution marked by percentages.
Figure 9B:
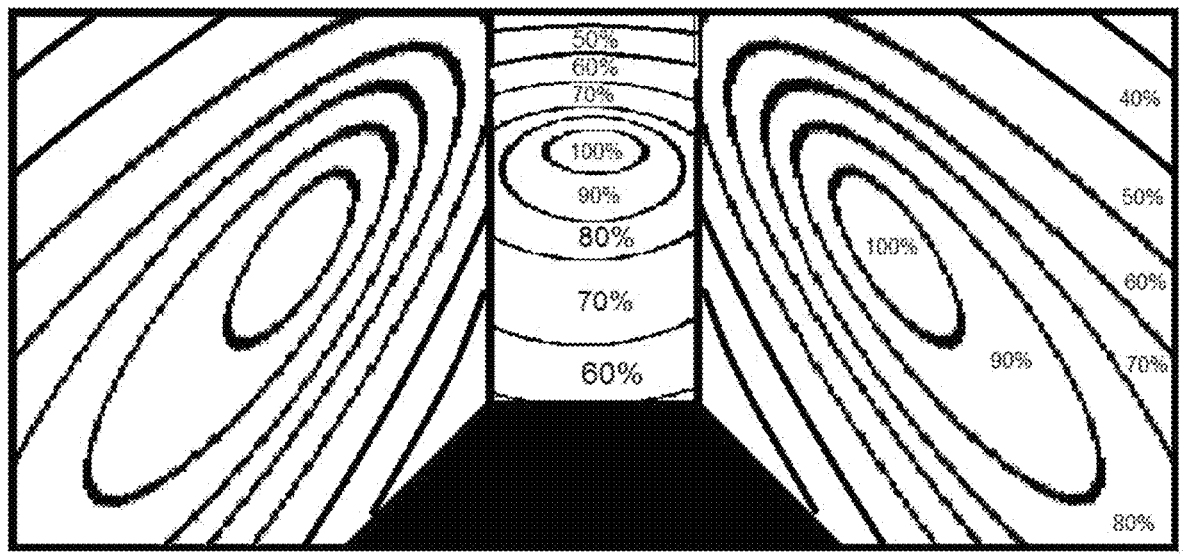
FIG. 9B is a schematic showing resolution of a rear camera of the present invention, having a high distortion lens shifted along the imager's short side in combination with the imager long side lens shifted side cameras.

Both the solution suggested in U.S. Publication No. US-2010-0020170 using common fisheye rear cameras with centered imagers (see displayed image from such cameras in FIG. 7) for the two side cameras and the rear camera as well as solutions having side cameras in accordance with International Publication No. WO 2014/204794, but having common fisheye rear cameras with centered imagers (FIG. 8) suffer under low resolution in the horizontal view area. In the diagrams of FIGS. 9A and 9B, the center rear camera is in the box in the middle. In FIG. 9A, the rear camera has a common fish eye lens with centered imager. The declining resolution towards higher angles is emphasized.

Figure 11A:
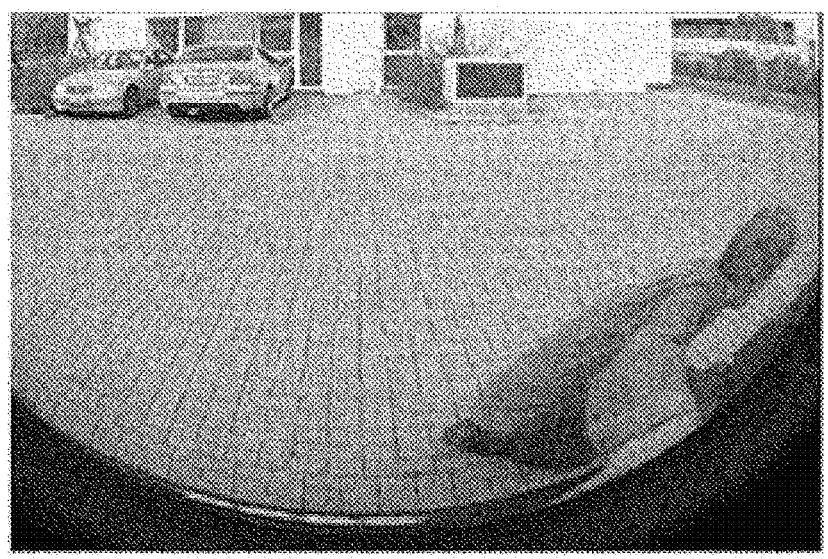
FIG. 11A is an image taken by a camera with a height distortion lens to imager assembled off center of the (rectangle) imager along the short side of the imager, such as shown in FIG. 10, in accordance with the present invention.
Figure 11B:
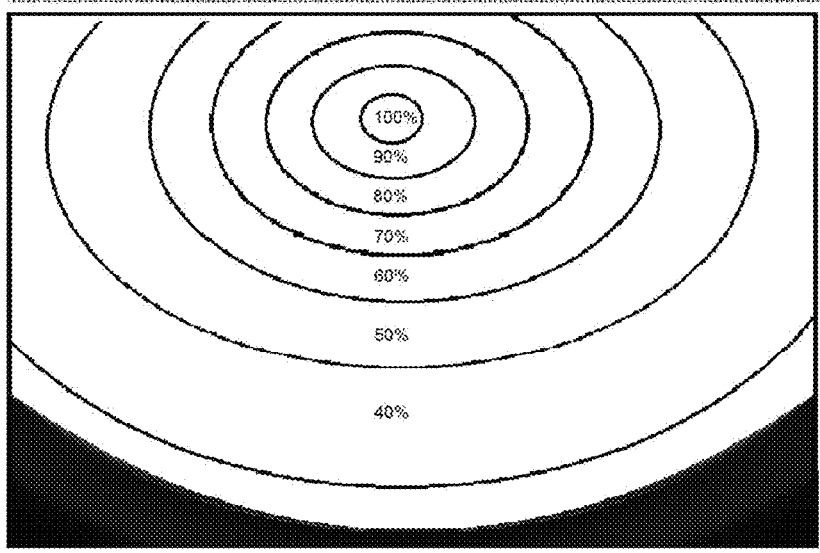
FIG. 11B is a schematic showing the percentage of the camera's resolution.
Figure 11C:
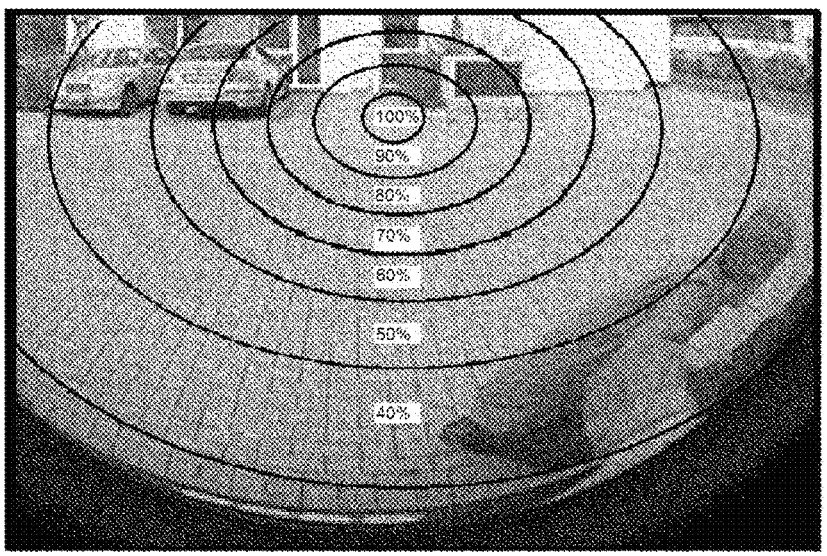
FIG. 11C shows the image of FIG. 11A overlayed with the schematic of FIG. 11B.

The present invention provides a vision system that uses a center camera having a fish eye lens or high distortion lens, preferably a high distortion fish eye lens, which is assembled off center of the (rectangular) imager along the short side of the imager, such as shown in FIG. 10. In the example of FIG. 10, the imager is shifted at about ⅓ of the imager's height along the short side (the vertical dimension of the imager). For example, a Sunex DSL 213 lens may be used with an Omnivision OV 10630 imager with the offset of the present invention. When using such a camera-lens configuration, the image in the center which may be directed to the rear horizon region at the rear of the vehicle may still be pleasing also in distance and may still show the left and right rear far edges area of the vehicle for safe maneuvering such as when parking and for generating a cross traffic view (see FIG. 11A). When attached in combination with side cameras (such as according to International Publication No. WO 2014/204794, incorporated above), an acceptable panorama view may be producible when stitching the side and the rear view images into a single merged or combined image (see FIG. 12A). FIG. 11B shows a diagram of the resolution distribution of a lens-imager shifted system in accordance with the present invention (shown in the example of FIG. 10). In FIG. 11C, the diagram of resolution is overlayed to the real image of FIG. 11A. The center or region of highest resolution is to be found at about the horizon. FIG. 9B shows the diagram of using such a rear camera of the present invention in combination with the imager long side lens shifted side cameras in accordance with International Publication No. WO 2014/204794. Compared to FIG. 9A, the resolution's maximum of each camera is at about the same height (and thus, the displayed image derived from captured and stitched image data from the three cameras provides a more uniform appearance and enhanced clarity along the horizon region). For comparison, the real images of a panorama rear view according the present invention in FIG. 12A is set beside a panorama rear view using a conventional imager centered lens rear camera in FIG. 12D, with the diagrams shown in FIGS. 12B and 12E and the rear image overlayed diagrams shown in FIGS. 12C and 12F (FIG. 9A is a smaller scaled version of FIG. 12B, and FIG. 9B is a smaller scaled version of FIG. 12E). As can be seen with reference to FIGS. 12A and 12D, the displayed image of FIG. 12A has a sharper focus and enhanced resolution at the center region, thus providing an enhanced displayed image having sharper clarity or resolution along the horizon region rearward of the vehicle.

Figure 13:
FIG. 13 is a displayed image having graphic overlays established thereon.

As another aspect of the invention, when producing a panorama view, there may be a rear turn mode. Optionally, and additionally or alternatively, this mode may be engaged when the rear or reverse gear is engaged. In that mode, an edge cage overlay of the outer vehicle contour may be overlayed on top of the rear panorama image. The cage overlay (such as a wireframe or outline of the vehicle as shown in FIG. 13) of the system of the present invention is for plausibilization of the equipped vehicle's extension relative to the vehicle's surrounding scene, such as may be provided by filled or partially or locally transparent overlays of known top view systems. The panels of the cage may not be filled or may be mostly transparent, in order to avoid hiding the image of the vehicle's rear. As an additional or alternative option, the driving path of the rear wheels in relation to the turning wheel angle may be overlayed (see FIG. 13). Similar to known rear camera rear vision systems, the curvature may be adapted dynamically when turning the steering wheel.

Departing from typical rear camera vision systems, the virtual view point is at the heights of the front seats looking rearwardly. Different to surround view vision systems, the side cameras are rearwardly directed and optionally have no fish eye lens systems with centered imagers but shifted lenses such as described in International Publication No. WO 2014/204794. The outside scene, rearwardly and sidewardly is captured much sharper and no skewing of objects with z-elevation occurs. That disturbing effect is known from surround view vision systems. Optionally, the rear wheel's rolling may be animated by an animated overlay (since the wheel's tire is typically not captured by any camera). It is known from single rear camera and top view or surround view systems to highlight collision hazards by colored overlays. It is also known to change the overlays color, such as, for example, from green over yellow to red with diminishing distance to a collision hazard object, and it may be static or (itself) moving. The system of the present invention may change the color of the cage edges overlayed into the panorama view according to the distance of a collision hazard object. The surrounding vertical objects may be detected by a non-image-based or non-camera sensor, such as a Radar, Ultrasound, TOF (time of flight) or Lidar sensor system or the like.

It is cost wise advantageous to have no additional sensors or devices (flash or LASER), but to just use the vision camera images to determine the distance to hazardous objects. A proper vision only method is to determine the distance of objects by analyzing the motion flow (structure from motion) such as according to International Publication No. WO 2012/145819, which is hereby incorporated herein by reference in its entirety. Alternatively, stereo vision may be used (such as by using aspects of the systems described in U.S. Pat. No. 6,396,397, which is hereby incorporated herein by reference in its entirety). Some of the camera vision fields may overlap. In these areas, stereo image computation is possible to determine a 3D scene understanding. Additionally or alternatively, size comparing methods for mono camera systems may come into use to accomplish this, such as by using aspects of U.S. Publication No. US-2013-0222592, which is hereby incorporated herein by reference in its entirety. As described in U.S. Publication No. US-2013-0222592, unknown total heights of a vehicle with luggage on top or the unknown total heights of a trailer within the camera's view are estimated by comparing the unknown heights in relation to elements of known heights in the camera's field of view. These also work when the vehicle and surrounding objects are not in motion.

In International Publication No. WO 2013/109869 (which is hereby incorporated herein by reference in its entirety), a vehicle vision system with free positional virtual panoramic view is described. International Publication No. WO 2013/109869 suggested to use imposters for view generation. Furthermore it was suggested to use a head/eye tracking system for generating a 3D parallax effect (also known as pseudo 3D or motion parallax scrolling) for the according viewer.

Figure 14:
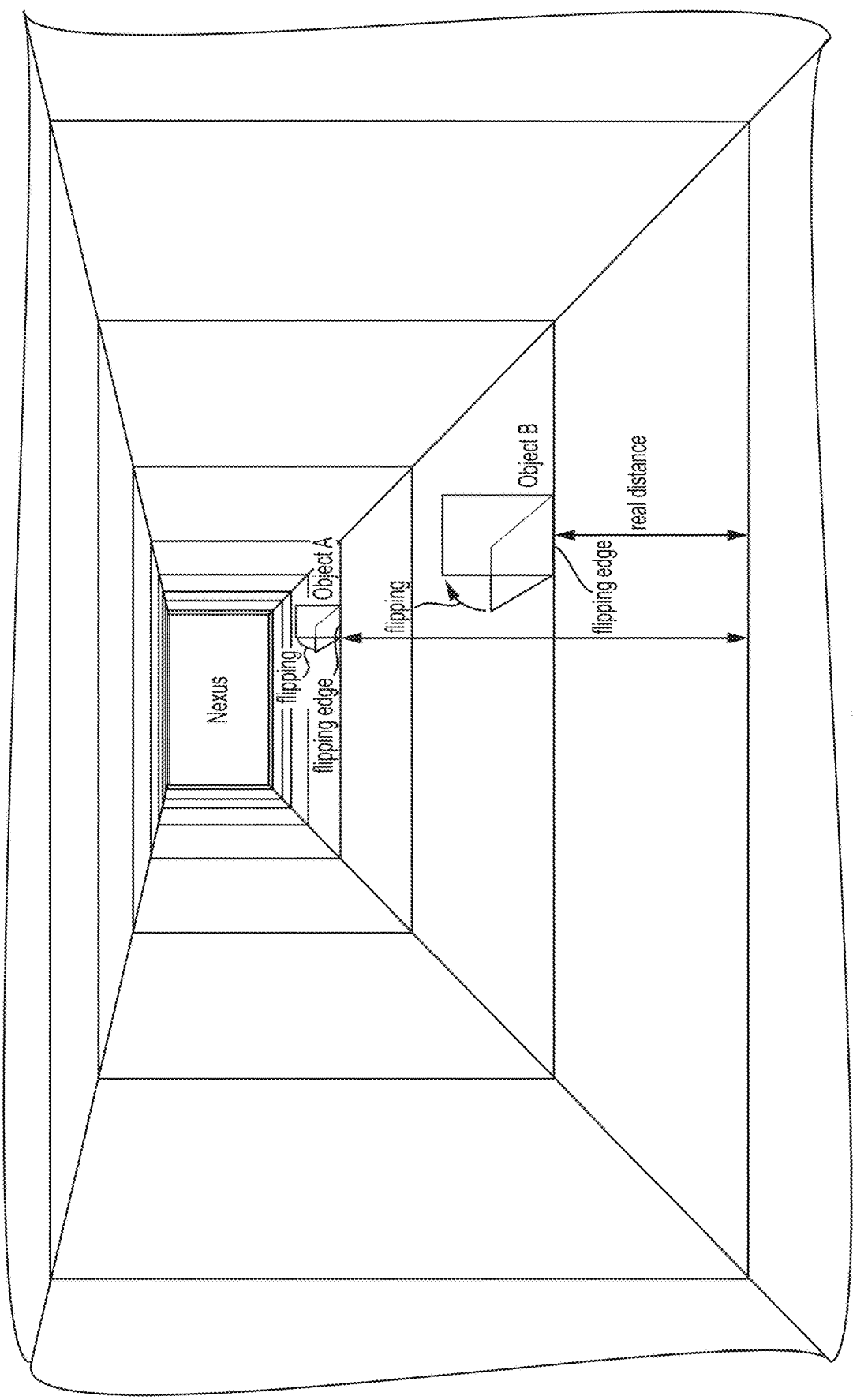
FIG. 14 is an image showing two objects at two different distances as imposters in a panoramic view.
Figure 15:
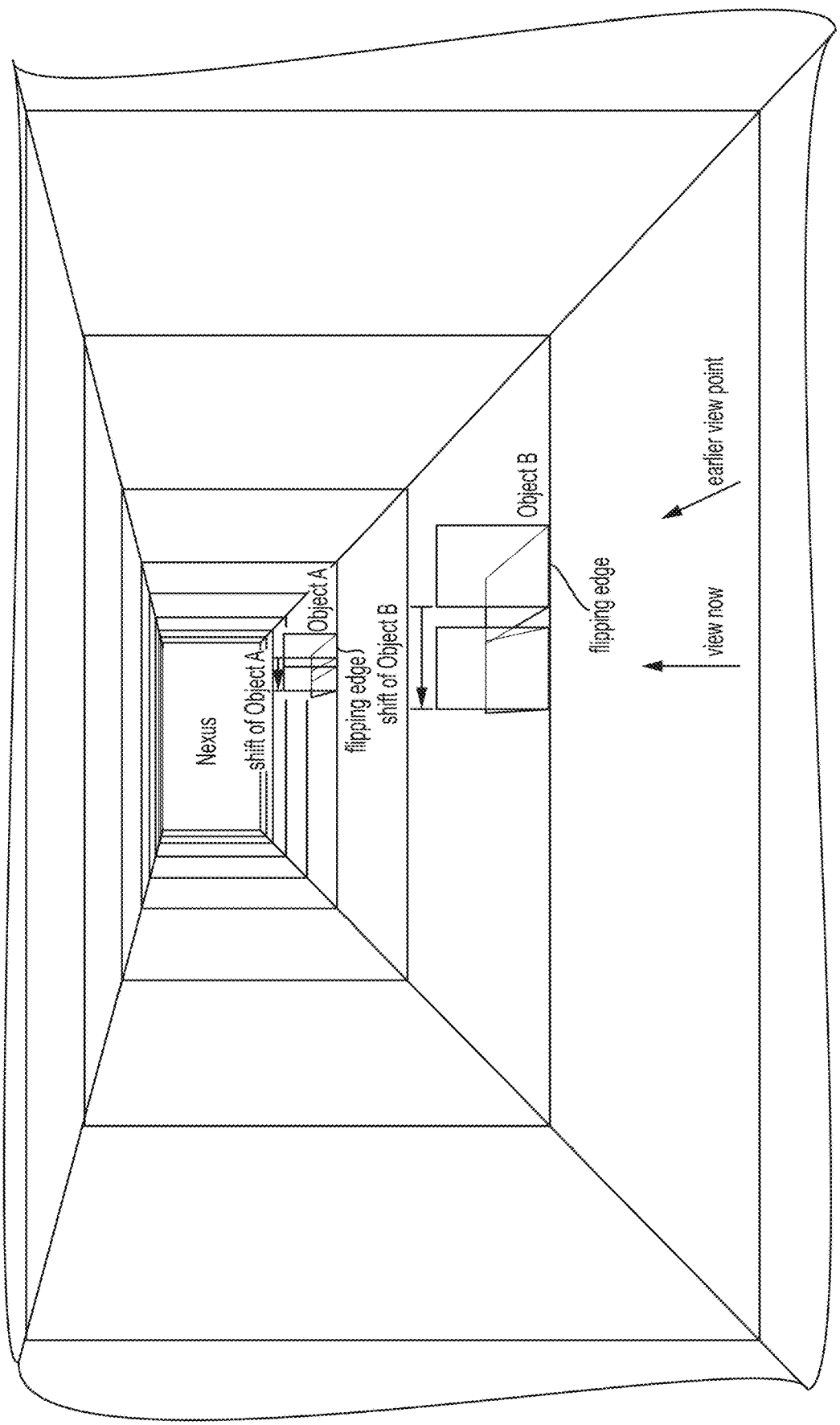
FIG. 15 is an image showing how the imposters in the image of FIG. 14 may shift according to a viewpoint change of a viewer whose head/eyes is/are being tracked.

The present invention provides a fish eye lens or high distortion lens that is assembled off center of the (rectangle) imager along the short side of the imager, such as shown in FIG. 10. When using images (such as seen in FIG. 11A) from the rear camera with a configuration as suggested in FIG. 10, a rearwardly facing panorama view may have such improved quality that generated imposters of objects (with distance optionally detected by the methods described above) have enough resolution to please a viewer. The virtual view object distances may correspond substantially or exactly or may be ordered in quantized distance steps (coulisse layers). Optionally, an in cabin head/eye tracker may be used additionally (such as in accordance with International Publication No. WO 2013/109869) for providing a (real time) 3D motion parallax scrolling. The example of FIG. 14 shows two objects in two different distances as imposters in a panoramic view. FIG. 15 shows how the imposters may shift according to a viewpoint change of a viewer who has his or her head/eyes being tracked (such as by an interior monitoring system or the like). In the example of FIG. 15, the 'earlier view point' may be the view as shown in FIG. 14, the 'view now' may be the view after the shift of the viewer's position was done. The use of imposters is beneficial compared to the computation effort that a scene using a 3D rendering would require. This method is especially interesting to use for generating a panorama view when objects are in relatively short distance to the vehicle's rear, such as in a range of about 0 m to about 40 m. Optionally, the vision system of the present invention may switch or smoothly alter the view generation depending on the distance of the closest (detected) objects rearward of the vehicle. The system may use the input of several cameras, preferably the two (at least partially) rearward viewing side cameras. For displaying the panorama vision, the system may optionally have a wide screen head up display system, optionally with 3D capability, and optionally with the ability to compensate eye defects such as presbyopia, such as by utilizing aspects of the systems described in U.S. provisional application Ser. No. 62/173,435, filed Jun. 10, 2015, which is hereby incorporated herein by reference in its entirety.

Thus, the present invention provides a vision system with a rearward facing camera (at a rear portion of a vehicle) having an imager with its wide angle or fisheye lens offset relative to the center of the camera and offset along the shorter side dimension of the imager. The rear camera captures images of the scene rearward of the vehicle and the captured images include the left and rear portions of the rear of the vehicle. Thus, when the rear image is combined or merged or stitched with images captured by the side mounted cameras (having fields of view sideward and rearward of the vehicle), the displayed stitched image provides an enhanced image for viewing by the driver of the vehicle, such as during a reversing maneuver of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European Patent Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for displaying video images via a vehicular vision system, the method comprising:
providing a rear backup camera;
wherein providing the rear backup camera comprises (i) providing an imager comprising a two dimensional imaging array sensor having a plurality of photosensing elements arranged in rows and columns and (ii) disposing a wide angle lens at the imager with a center axis of the wide angle lens perpendicular to the imaging array sensor of the imager and offset from a center region of the imaging array sensor of the imager;
equipping a vehicle with the vehicular vision system;
wherein equipping the vehicle comprises disposing the rear backup camera at the vehicle, wherein, with the rear backup camera disposed at the vehicle, the rear backup camera has a field of view rearward of the vehicle;
wherein, with the rear backup camera disposed at the vehicle, the center axis of the wide angle lens is vertically offset from the center region of the imaging array sensor of the imager;
wherein, with the rear backup camera disposed at the vehicle, the field of view of the rear backup camera includes an external scene having (i) a distant central horizon region rearward of the vehicle and (ii) a closer region rearward of the vehicle that is closer to the vehicle than the distant central horizon region;
wherein, with the rear backup camera disposed at the vehicle, (i) the distant central horizon region is imaged at an upper region of the imaging array sensor of the imager via light that has passed through a center region of the wide angle lens and (ii) the closer region is imaged at the center region and a lower region of the imaging array sensor of the imager via light that has passed through a lower peripheral region of the wide angle lens;
with the rear backup camera disposed at the vehicle, and during a reversing maneuver of the vehicle, capturing image data by the imaging array sensor of the imager;
wherein capturing image data comprises capturing image data at the upper region of the imaging array sensor of the imager that is associated with light that has passed through the center region of the wide angle lens and capturing image data at the center region and the lower region of the imaging array sensor of the imager that is associated with light that has passed through the lower peripheral region of the wide angle lens;
wherein the image data captured at the upper region of the imaging array sensor of the imager has less distortion than the image data captured at the center region and the lower region of the imaging array sensor of the imager;
displaying video images derived from image data captured by the rear backup camera on a video display for viewing by a driver of the vehicle during the reversing maneuver of the vehicle; and
wherein, as displayed on the video display for viewing by the driver of the vehicle during the reversing maneuver of the vehicle, the displayed video images of the imaged external scene have less distortion at the imaged and displayed distant central horizon region rearward of the vehicle as compared to distortion at the imaged and displayed closer region rearward of the vehicle.

2. The method of claim 1, wherein the imaging array sensor of the imager has a shorter cross dimension and a longer cross dimension, and wherein, with the rear backup camera disposed at the vehicle, the longer cross dimension of the imaging array sensor is horizontal and the shorter cross dimension of the imaging array sensor is vertical.

3. The method of claim 1, wherein the field of view of the rear backup camera, with the rear backup camera disposed at the vehicle, includes at least one rear portion of the vehicle.

4. The method of claim 1, comprising establishing a graphic overlay on the displayed video images.

5. The method of claim 4, wherein the graphic overlay comprises a wireframe outline of a rear portion of the vehicle.

6. The method of claim 5, wherein portions of the wireframe outline may be colored to represent panels of the vehicle.

7. The method of claim 4, wherein the graphic overlay comprises indicia representative of a driving path of the vehicle during the reversing maneuver.

8. The method of claim 7, wherein the indicia is adjusted responsive to a steering wheel angle of the vehicle.

9. The method of claim 1, comprising processing via an image processor of the vehicular vision system image data captured by the rear backup camera.

10. The method of claim 9, wherein the image processor processes captured image data to determine presence of objects rearward of the vehicle.

11. The method of claim 10, comprising, responsive to image processing of captured image data at the image processor, adjusting a position of an object in displayed video images to account for a change in position or viewpoint of the driver of the vehicle.

12. The method of claim 11, wherein the position of the object in displayed video images is adjusted responsive to a driver monitoring system that monitors a head or eyes of the driver of the vehicle.

13. The method of claim 11, wherein the position of the object in displayed video images is adjusted responsive to a distance of a closest determined object rearward of the vehicle.

14. The method of claim 9, wherein the image processor processes image data captured by the rear backup camera to provide the video images for display on the video display for viewing by the driver of the vehicle during the reversing maneuver of the vehicle.

15. The method of claim 1, wherein, as displayed on the video display for viewing by the driver of the vehicle during the reversing maneuver of the vehicle, the displayed video images of the imaged external scene have enhanced image resolution at the imaged and displayed distant central horizon region rearward of the vehicle as compared to image resolution at the imaged and displayed closer region rearward of the vehicle.

16. A method for displaying video images via a vehicular vision system, the method comprising:
providing a rear backup camera;
wherein providing the rear backup camera comprises (i) providing an imager comprising a two dimensional imaging array sensor having a plurality of photosensing elements arranged in rows and columns and (ii) disposing a wide angle lens at the imager with a center axis of the wide angle lens perpendicular to the imaging array sensor of the imager and offset from a center region of the imaging array sensor of the imager, and wherein the imaging array sensor of the imager has a shorter cross dimension and a longer cross dimension;
equipping a vehicle with the vehicular vision system;
wherein equipping the vehicle comprises disposing the rear backup camera at the vehicle, wherein, with the rear backup camera disposed at the vehicle, the rear backup camera has a field of view rearward of the vehicle;
wherein, with the rear backup camera disposed at the vehicle, the longer cross dimension of the imaging array sensor is horizontal and the shorter cross dimension of the imaging array sensor is vertical;
wherein, with the rear backup camera disposed at the vehicle, the center axis of the wide angle lens is vertically offset from the center region of the imaging array sensor of the imager;
wherein the field of view of the rear backup camera, with the rear backup camera disposed at the vehicle, includes at least one rear portion of the vehicle;
wherein, with the rear backup camera disposed at the vehicle, the field of view of the rear backup camera includes an external scene having (i) a distant central horizon region rearward of the vehicle and (ii) a closer region rearward of the vehicle that is closer to the vehicle than the distant central horizon region;
wherein, with the rear backup camera disposed at the vehicle, (i) the distant central horizon region is imaged at an upper region of the imaging array sensor of the imager via light that has passed through a center region of the wide angle lens and (ii) the closer region is imaged at the center region and a lower region of the imaging array sensor of the imager via light that has passed through a lower peripheral region of the wide angle lens;
with the rear backup camera disposed at the vehicle, and during a reversing maneuver of the vehicle, capturing image data by the imaging array sensor of the imager;
wherein capturing image data comprises capturing image data at the upper region of the imaging array sensor of the imager that is associated with light that has passed through the center region of the wide angle lens and capturing image data at the center region and the lower region of the imaging array sensor of the imager that is associated with light that has passed through the lower peripheral region of the wide angle lens;
wherein the image data captured at the upper region of the imaging array sensor of the imager has less distortion than the image data captured at the center region and the lower region of the imaging array sensor of the imager;
displaying video images derived from image data captured by the rear backup camera on a video display for viewing by a driver of the vehicle during the reversing maneuver of the vehicle; and
wherein, as displayed on the video display for viewing by the driver of the vehicle during the reversing maneuver of the vehicle, the displayed video images of the imaged external scene have less distortion at the imaged and displayed distant central horizon region rearward of the vehicle as compared to distortion at the imaged and displayed closer region rearward of the vehicle.

17. The method of claim 16, comprising processing via an image processor of the vehicular vision system image data captured by the rear backup camera.

18. The method of claim 17, wherein the image processor processes captured image data to determine presence of objects rearward of the vehicle.

19. The method of claim 17, wherein the image processor processes image data captured by the rear backup camera to provide the video images for display on the video display for viewing by the driver of the vehicle during the reversing maneuver of the vehicle.

20. The method of claim 16, wherein, as displayed on the video display for viewing by the driver of the vehicle during the reversing maneuver of the vehicle, the displayed video images of the imaged external scene have enhanced image resolution at the imaged and displayed distant central horizon region rearward of the vehicle as compared to image resolution at the imaged and displayed closer region rearward of the vehicle.

21. A method for displaying video images via a vehicular vision system, the method comprising:
providing a rear backup camera;
wherein providing the rear backup camera comprises (i) providing an imager comprising a two dimensional imaging array sensor having a plurality of photosensing elements arranged in rows and columns and (ii) disposing a wide angle lens at the imager with a center axis of the wide angle lens perpendicular to the imaging array sensor of the imager and offset from a center region of the imaging array sensor of the imager;
equipping a vehicle with the vehicular vision system;
wherein equipping the vehicle comprises disposing the rear backup camera and an image processor at the vehicle, wherein, with the rear backup camera disposed at the vehicle, the rear backup camera has a field of view rearward of the vehicle;
wherein, with the rear backup camera disposed at the vehicle, the center axis of the wide angle lens is vertically offset from the center region of the imaging array sensor of the imager;
wherein, with the rear backup camera disposed at the vehicle, the field of view of the rear backup camera includes an external scene having (i) a distant central horizon region rearward of the vehicle and (ii) a closer region rearward of the vehicle that is closer to the vehicle than the distant central horizon region;
wherein, with the rear backup camera disposed at the vehicle, (i) the distant central horizon region is imaged at an upper region of the imaging array sensor of the imager via light that has passed through a center region of the wide angle lens and (ii) the closer region is imaged at the center region and a lower region of the imaging array sensor of the imager via light that has passed through a lower peripheral region of the wide angle lens;

with the rear backup camera disposed at the vehicle, and during a reversing maneuver of the vehicle, capturing image data by the imaging array sensor of the imager;

wherein capturing image data comprises capturing image data at the upper region of the imaging array sensor of the imager that is associated with light that has passed through the center region of the wide angle lens and capturing image data at the center region and the lower region of the imaging array sensor of the imager that is associated with light that has passed through the lower peripheral region of the wide angle lens;

wherein the image data captured at the upper region of the imaging array sensor of the imager has less distortion than the image data captured at the center region and the lower region of the imaging array sensor of the imager;

processing via the image processor image data captured by the rear backup camera;

wherein the image processor processes captured image data to determine presence of objects rearward of the vehicle;

wherein the image processor processes image data captured by the rear backup camera to provide video images for display on a video display in the vehicle;

displaying the video images derived from image data captured by the rear backup camera on the video display for viewing by a driver of the vehicle during the reversing maneuver of the vehicle; and wherein, as displayed on the video display for viewing by the driver of the vehicle during the reversing maneuver of the vehicle, the displayed video images of the imaged external scene have less distortion at the imaged and displayed distant central horizon region rearward of the vehicle as compared to distortion at the imaged and displayed closer region rearward of the vehicle.

22. The method of claim 21, wherein the imaging array sensor of the imager has a shorter cross dimension and a longer cross dimension, and wherein, with the rear backup camera disposed at the vehicle, the longer cross dimension of the imaging array sensor is horizontal and the shorter cross dimension of the imaging array sensor is vertical.

23. The method of claim 21, comprising, responsive to image processing of captured image data at the image processor, adjusting a position of an object in displayed video images to account for a change in position or viewpoint of the driver of the vehicle.

24. The method of claim 23, wherein the position of the object in displayed video images is adjusted responsive to a driver monitoring system that monitors a head or eyes of the driver of the vehicle.

25. The method of claim 23, wherein the position of the object in displayed video images is adjusted responsive to a distance of a closest determined object rearward of the vehicle.

26. The method of claim 21, wherein, as displayed on the video display for viewing by the driver of the vehicle during the reversing maneuver of the vehicle, the displayed video images of the imaged external scene have enhanced image resolution at the imaged and displayed distant central horizon region rearward of the vehicle as compared to image resolution at the imaged and displayed closer region rearward of the vehicle.

\* \* \* \* \*